United States Patent [19]
Schubert

[11] Patent Number: 5,819,720
[45] Date of Patent: Oct. 13, 1998

[54] PORTABLE BARBECUE STAND

[76] Inventor: Robert L. Schubert, 1410 11th St., Havre, Mont. 59501

[21] Appl. No.: 845,887

[22] Filed: Apr. 28, 1997

Related U.S. Application Data

[60] Provisional application No. 60/017,618 May 14, 1996.

[51] Int. Cl.⁶ .............................. A47J 37/00; F24C 3/00
[52] U.S. Cl. ..................... 126/41 R; 126/25 R; 248/156; 248/545
[58] Field of Search ..................................... 126/9 R, 9 A, 126/9 B, 25 R, 25 A, 25 AA, 41 R, 40, 50; 248/156, 545; 99/450, 449, 446

[56] References Cited

U.S. PATENT DOCUMENTS

| | | | |
|---|---|---|---|
| 3,070,084 | 12/1962 | Gier et al. | 126/25 R |
| 3,785,361 | 1/1974 | Mejyr et al. | 126/41 R |
| 4,403,596 | 9/1983 | Thomas . | |
| 4,721,037 | 1/1988 | Blosnich | 126/41 R |
| 4,836,480 | 6/1989 | Besner | 126/9 R |
| 4,856,423 | 8/1989 | Burns . | |
| 4,896,651 | 1/1990 | Kott, Jr. . | |
| 4,979,490 | 12/1990 | Nudo et al. . | |
| 5,355,867 | 10/1994 | Hall et al. . | |
| 5,404,795 | 4/1995 | Coble . | |

FOREIGN PATENT DOCUMENTS

| | | |
|---|---|---|
| 1601379 | 4/1954 | France . |
| 2298301 | 8/1976 | France . |

*Primary Examiner*—James C. Yeung
*Attorney, Agent, or Firm*—Richard C. Litman

[57] ABSTRACT

A stand for a portable barbecue grill. The stand includes a connecting flange, a telescopic sleeve with a height adjustment pin, and a spike. The connecting flange has a seat portion that is bolted through holes in the base of a portable barbecue. Further, the connecting flange has a mounting sleeve. The telescopic sleeve has a flange end and a spike receiving end. In the preferred embodiment the flange end of the telescopic sleeve is threadably received by the mounting sleeve of the flange. Finally, the stand includes a spike with a spiked end that is inserted into the ground. The spike is slidably received by the telescopic sleeve. Both the spike and the telescopic sleeve have a plurality of holes along their length that can be aligned for receiving a height adjusting cotter pin.

5 Claims, 2 Drawing Sheets

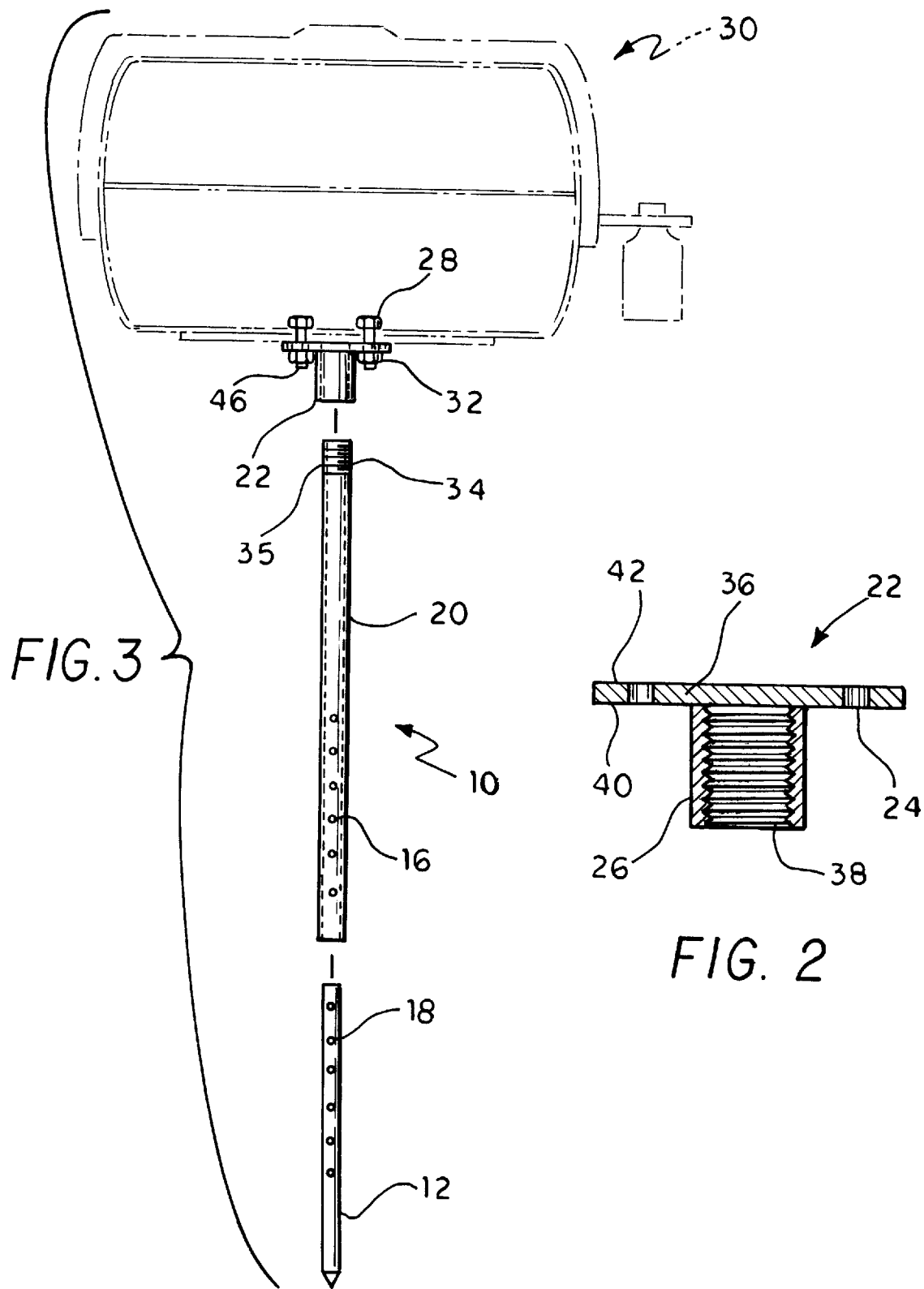

5,819,720

PORTABLE BARBECUE STAND

CROSS-REFERENCE TO RELATED APPLICATION

This application claims the benefit of U.S. Provisional Patent Application Ser. No. 60/017,618, filed. May 14, 1996.

BACKGROUND OF THE INVENTION

1. Field of the Invention

The present invention is a stand that can be attached to the base or underside of a small light-weight, portable barbecue grill that is not manufactured with a stand. The stand has a connecting flange for attaching the stand to a barbecue grill, an adjustable sleeve so the user can adjust the height of the grill, and a spike for supporting the stand in the ground.

2. Description of Related Art

Small portable barbecue grills, such as an hibachi style grills or portable propane camping barbecues, often do not include stands. Even if they do include a stand, the stands are not sufficiently sturdy to be considered safe. Hence, these grills are often placed directly on the surface a picnic table during cooking. For several reasons a picnic table is unsatisfactory: 1) often a table is unavailable, thereby forcing the user to inconveniently place the barbecue on the ground; 2) picnic tables are generally an inappropriate height for cooking; 3) the heat generated from the base of the grill can burn the surface of a wooden table; and 4) children are often present at the table. The instant invention eliminates these inconveniences.

The present invention is a sturdy device that permits the cook to adjust the height of the grill according to need. Also, the present invention provides the outdoor cook greater freedom and flexibility then previously has been available. Not only can the height be adjusted, but the ground spike that supports the grill can placed, and repositioned, at any convenient location within the campsite. Finally, the stand is easily attached and detached to any portable grill so that the user can quickly dismantle, clean and store the grill.

Some existing grilling devices include stands that are adjustable, however the stands on many current outdoor grills and rotisseries are integral with the device and, consequently, not adaptable to the sort of portable barbecue to which the present invention is intended. Even though some currently available portable grills do have adjustable stands that include ground stakes, these devices rely on ground campfires as the source of cooking energy and must necessarily be close to the campfire.

Since the grill must be near the campfire in order to operate properly, any useful height adjustment is thus precluded.

The present invention permits the cook to raise or lower the grill, including the firebox, to a height that is convenient and comfortable. This height adjustment feature is especially important to those who enjoy outdoor camping and picnicking, and cannot endure the stress on the joints and the lower back that stooping over to cook on the ground requires.

Several U.S. patents describe large non-portable barbecue pits that are permanently mounted on stands. For example, U.S. Pat. No. 4,403,596 that was issued to Thomas on Sep. 13, 1983, describes a barbecue of a robust construction, having a firebox, a cantilevered grill and a mounting post, the mounting post to be permanently set into the ground. This device is the type of cooking grill most often seen in state and national parks; it is vandal proof and not portable. Further, the height of the surface of the grill cannot be adjusted. Consequently, this device does not teach or enable one skilled in the art to make an adjustable stand for a light weight portable barbecue grill.

U.S. Pat. No. 5,404,795 issued to Coble on Apr. 11, 1995, describes a barbecue pit that has a stand, a grill, a firebox and a cover. This cooking device is also not portable and has a stand that is an integral part of the barbecue, and thus it is not adaptable to the present invention.

Furthermore, U.S. Pat. No. 4,856,423 issued to Burns on Aug. 15, 1989, describes a portable rotisserie apparatus that includes an adjustable stand and a stake. Although this device does include a platform for a fire, unlike a barbecue there is no mechanism for damping the fire or controlling the heat. Furthermore, the stand is an integral part of the rotisserie and therefore it is unadaptable to a portable barbecue of the type for which the present invention is specifically configured.

Several U.S. patents describe embodiments of portable grills that have stakes that are adjustable, but only to a limited extent. To cook effectively the grills must be close to the ground and the campfire. These devices all rely on a ground campfire as the source of cooking heat, whereas the present invention is adapted to devices that include a firebox. None of the portable grills can be adjusted to a convenient or comfortable height.

For example, U.S. Pat. No. 4,896,651 issued to Kott, Jr. on Jan. 30, 1990, describes a portable cooking grill with an adjustable stand having a stake that can be driven into the ground near a campfire to situate the grill above the cooking fire. Similarly, U.S. Pat. No. 4,979,490 issued to Nudo et al. on Dec. 25, 1990, describes an adjustable campfire grill that also includes a stake that can be driven into the ground next to a campfire. And finally, U.S. Pat. No. 5,355,867 issued to Hall et al. on Oct. 18, 1994, describes another portable grill that relies on the radiant heat from a campfire to cook food that must be placed near the ground. Because the present invention permits the users to raise and lower the grill including the firebox, on which the grill is placed, the cook's task is eased and made more pleasurable. Furthermore, none of the above described campfire grills have stands that are adaptable, or enable one skilled in the art to adapt an adjustable stand, to a portable barbecue pit.

Finally two French patents describes outdoor cooking devices. French Brevet D' Invention No. 1,061,379 published by Maret on Apr. 12, 1954, describes a collapsible grill, however no stand is described, taught, or enabled. French Brevet D' Invention Pub. No. 2,298,301 published by Ettlinger on Aug. 20, 1976, describes a barbecue pit having a telescopic stand, however this device is not portable. The stand is not detachable nor adaptable to a smaller portable grill such as an hibachi or a portable propane picnic grill. Neither French patent publication teaches a mechanism whereby a portable barbecue grill can be rendered safe, nor do they describe a grill that is adjustable to suit the needs and comfort of the cook.

None of the above inventions and patents, taken either singly or in combination, is seen to describe the stand for a portable barbecue as claimed.

SUMMARY OF THE INVENTION

The present invention is a stand for portable barbecue grill. Small portable camping or picnic barbecue grills do not include stands that are sufficiently sturdy to permit the grill to be safely used as intended, on the surface of a picnic table. Should the prudent user decide not to cook on a picnic table, the only alternative is to inconveniently place the barbecue on the ground. Regardless of where the portable grill is placed it tends to suffer from an inherent instability. Without a sturdy stand, such as provided by the present invention, the barbecue is dangerously easy to tip over.

The present invention is a detachable stand that can be readily adapted to fit a small light-weight grill for eliminating the inherent risks of cooking with an open fire on a picnic table in the vicinity of children or adults. Further, the present invention allows the user to adjust the height of the barbecue to a comfortable cooking level.

The present invention is specifically adapted to be used with small light weight portable propane grills, which include a set of drain holes in the base of the firebox. However, it is intended that the present invention should also be easily and quickly adapted to other styles of portable grills, such as a hibachi that also does not have stands.

The portable barbecue grill stand includes a connecting flange having a seat portion and a threaded mounting sleeve. The seat portion has an upper surface that sits against the base of the grill provided with drain holes, a lower surface from which the mounting flange extends, and a plurality of holes. The holes on the flange seat portion are positioned in registry with the drain holes in the base of the grill. Threaded bolts are inserted through the drain holes of the grill and into the holes in the flange seat portion; thereafter, nuts are threaded onto the bolts and firmly tightened against the lower surface of the flange seat portion.

The portable barbecue stand also includes a telescopic sleeve which is externally threaded for mating within the internally threaded mounting sleeve of the connecting flange. The telescopic sleeve also has a plurality of holes being arranged along its length for adjusting the height of the stand. Finally, the stand includes a spike that can be hammered or otherwise inserted into the ground and that is adapted for slidably receiving the telescopic sleeve. The spike includes a plurality of holes along its length that can be aligned with the holes on the telescopic sleeve so that a cotter pin can be inserted for adjusting the height of the grill.

Accordingly, it is a principal object of the invention to provide a stand for a portable grill having a connecting flange, a telescopic sleeve with a pin, and a spike.

It is another object of the invention that the connecting flange including a seat portion having a plurality of holes, upon which a portable barbecue is seated and bolted to the barbecue.

It is a further object of the invention to provide a connecting flange with a threaded mounting sleeve that is threaded on to a telescopic sleeve, the telescopic sleeve having a plurality of holes along its length.

It is still another object of the invention to provide a spike that can be driven into the ground and is adapted for receiving the telescopic sleeve.

It is a further object of the present invention to provide a spike including a plurality of holes along its length, which can be aligned with the holes on the telescopic sleeve, for adjusting the height of the barbecue with a cotter pin.

It is an object of the invention to provide improved elements and arrangements thereof in stand for a portable grill for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is an enlarged cross-sectional view of a connecting flange according to the present invention showing the seat portion and the threaded sleeve.

FIG. 3 is a side, elevational, exploded view of a portable barbecue stand according to the present invention, further showing the connecting flange for use with the base of a barbecue grill.

Similar reference characters denote corresponding features consistently throughout the attached drawings.

DETAILED DESCRIPTION OF THE PREFERRED EMBODIMENT

Figure 1:
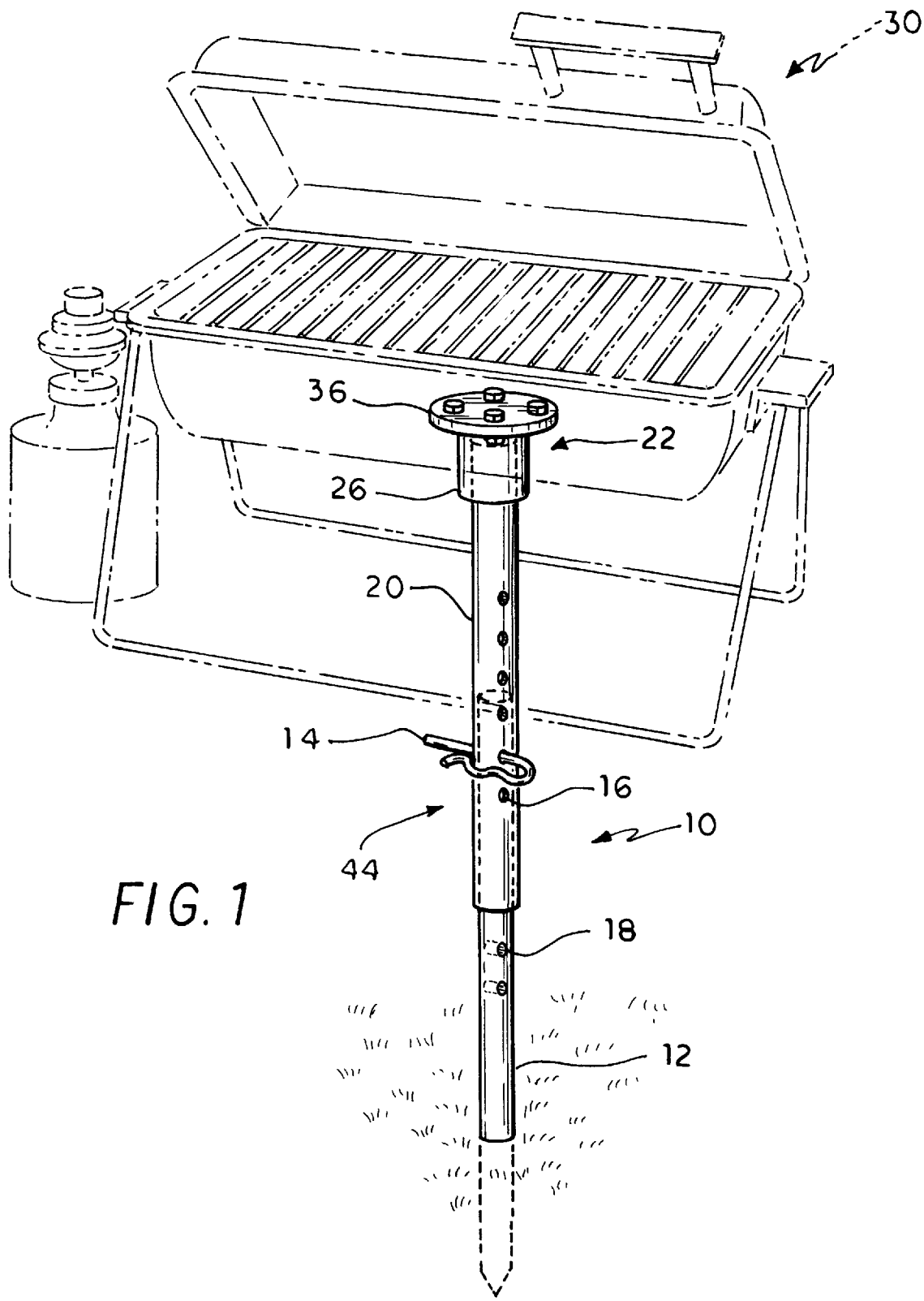
FIG. 1 is a perspective view of a portable barbecue stand according to the present invention showing the invention supporting a portable barbecue grill.

The present invention is a stand for use with a portable barbecue grill having several drain holes, the present invention including a connecting flange adapted to attach using the drain holes, a telescopic sleeve, a spike, and a height adjustment pin. As shown in FIG. 1 the portable barbecue stand 10 includes a connecting flange 22, a telescopic sleeve 20, a spike 12, and a height adjustment pin 14.

As shown in FIG. 2 the connecting flange 22 has a mounting seat portion 36 and a mounting sleeve 26. The mounting seat portion 36 has an upper surface 42 and a lower surface 40, the barbecue grill 30 being mounted on the upper surface 42, and the mounting sleeve 26 connected to the lower surface 40. Furthermore, the mounting seat portion 36 has a plurality of holes 24, for receiving a plurality of bolts 28.

FIG. 3 shows the manner that the connecting flange 22 is connected to the telescopic sleeve 20. The telescopic sleeve 20 has a mounting sleeve receiving end 34 whereby the telescopic sleeve 20 is inserted into the mounting sleeve 26 of the connecting flange 22. FIG. 3 also shows the manner of attachment of the stand to the portable barbecue grill 30. To secure the barbecue grill 30 to the adjustable stand 10, the preexisting drain holes of the barbecue (not shown) are aligned with the holes 24 (FIG. 2) provided in the connecting flange 22. The bolts 28 are inserted through the drain holes of the barbecue grill 30 and the connecting flange 22. To securely fasten the barbecue to the flange, a plurality of nuts 32 are threaded onto the threaded ends of the bolts 46, and tightened against the lower surface 40 of the seat portion 36.

For adjusting the height of the barbecue grill 30, the barbecue stand 10 includes a telescopic sleeve 20. The telescopic sleeve 20 has a plurality of holes 16 arranged along the length of the telescopic sleeve 20. Furthermore, the stand 10 includes a spike 12 that is driven into the ground, the telescopic sleeve 20 being inserted over the spike 12. The spike 12 also has a plurality of holes 18 that can be aligned with the holes 16 of the telescopic sleeve 20. Once the user has aligned the holes 18 of the spike 12 with the holes 16 of the telescopic sleeve 20, a height adjustment pin 14 can be inserted, as indicated by arrow 44, through the holes, 16 and 18, for securing the desired height of the barbecue grill 30.

In the preferred embodiment, the mounting sleeve 26, the telescopic sleeve 20, and the spike 12 are cylindrical, however one skilled in the art will recognize that any shape can be utilized that is suited for the purposes described herein. Furthermore, in the preferred embodiment, the mounting sleeve 26 and the mounting sleeve receiving end 34 of the telescopic sleeve 20 are matingly threaded (38 and 35 respectively), for attaching one to the other. Alternatively, the manner in which the mounting sleeve 26 and the telescopic sleeve 20 are attached can be accomplished in any manner, so long as the mounting sleeve 26 is securely seated on the telescopic sleeve 20. Also in the preferred embodiment, the height adjustment pin 14 is a cotter pin, but alternatively any other adjusting structure would be suitable, such as a bolt and nut.

Additionally, in the preferred embodiment the connecting flange 22, the telescopic sleeve 20, and the spike 12 are made of steel, however any material of sufficient strength and durability is suitable, such as aluminum. Finally, in the preferred embodiment the nuts 32 and bolts 28 are ¼", the telescopic sleeve 20 is 1" diameter×30 length", and the spike 12 is ¾" diameter ×20" length.

The present invention 10 allows the user to attach the connecting flange 22 to any portable grill 30 either by using several of the existing drain holes or by drilling holes through the base of the grill 30. The connecting flange 22 will not interfere with the normal operation of the grill 30. Therefore, the user will have the option of either using the grill 30 in its normal operating mode or it will allow the user to easily and quickly attach the telescopic sleeve 20 and spike 12 to the connecting flange 22 and use the grill 30 on a convenient height adjustable stand 10. The user then simply dismantles the telescopic sleeve 20 and the spike 12 from the connecting flange 22 for easy cleaning and transporting of the grill 30.

It is to be understood that the present invention is not limited to the sole embodiment described above, but encompasses any and all embodiments within the scope of the following claims.

I claim:

1. A stand for a portable barbecue, comprising:

securing means for detachably securing said stand to the barbecue including,
 a connecting flange having a mounting seat portion and a mounting sleeve, said mounting seat portion having an upper surface, a lower surface, and a plurality of apertures, said upper surface for abutting the barbecue, said mounting sleeve attached to said lower surface, said mounting sleeve including internal threads,
 a plurality of bolts extending through said plurality of apertures for detachably engaging drain holes in the barbecue, and
 a plurality of nuts mated with said plurality of externally threaded bolts;

supporting means for supporting said stand in a generally upright position, said supporting means including,
 a rod having a ground end and a receiving end, said ground end having a point, said rod having a first plurality of holes; and
 adjusting means for adjusting the height of the barbecue, said adjusting means detachably connected to said securing means, said adjusting means including
  a telescopic sleeve having a mounting end including external threads engaging said mounting sleeve and a telescopic end slidably receiving said receiving end of said rod, said telescopic sleeve having a second plurality of holes alignable of being aligned with said first plurality of holes, and
  a pin extendable through said first plurality of holes and said second plurality of holes.

2. The stand for a portable barbecue according to claim 1, wherein said connecting flange is made from steel.

3. The stand for a portable barbecue according to claim 1, wherein said rod is made from steel.

4. The stand for a portable barbecue according to claim 1, wherein said telescopic sleeve is made from steel.

5. The stand for a portable barbecue according to claim 1, wherein:

said telescopic sleeve is tubular in shape, about one inch in diameter, and about thirty inches in length; and said rod is tubular in shape, about three-quarters of an inch in diameter, and about twenty inches in length.

* * * * *